United States Patent [19]

Porta et al.

[11] 4,319,973

[45] Mar. 16, 1982

[54] METHOD AND MACHINE FOR WASHING AND BLEACHING TEXTILES

[75] Inventors: Augusto Porta, Geneva; Antonin Kulhanek, Le Lignon, both of Switzerland; Alain Groult, Annemasse; Hervé Tourrier, Valleiry, both of France

[73] Assignee: Battelle Memorial Institute, Carouge, Switzerland

[21] Appl. No.: 129,976

[22] PCT Filed: Dec. 4, 1978

[86] PCT No.: PCT/CH78/00043

§ 371 Date: Aug. 6, 1979

§ 102(e) Date: Jul. 23, 1979

[87] PCT Pub. No.: WO79/00346

PCT Pub. Date: Jun. 28, 1979

[30] Foreign Application Priority Data

Dec. 6, 1977 [CH]  Switzerland ............... 14876/77

[51] Int. Cl.$^3$ .................. D06L 3/02; D21C 9/16; C25B 1/30
[52] U.S. Cl. .................................. 204/133; 8/111; 204/83

[58] Field of Search ............... 8/111; 204/133, 83

[56] References Cited

U.S. PATENT DOCUMENTS 3,506,560  4/1970  Grangaard ............... 204/83
3,616,442  10/1971  Cheng et al. ............ 204/83
3,969,201  7/1976  Oloman et al. .......... 204/83

*Primary Examiner*—Maria Parrish Tungol
*Attorney, Agent, or Firm*—Karl F. Ross

[57] ABSTRACT

This invention relates to a method for washing and bleaching textiles.

The method according to the invention, which is carried out by means of an aqueous wash bath containing a detergent substantially free from bleaching agent, is characterized in that said bleaching is performed by incorporating into said wash bath, at the required moment, an aqueous alkaline oxidizing solution containing in particular hydrogen peroxide ions, said aqueous alkaline oxidizing solution being produced electrolytically, immediately before its incorporation into said wash bath, by reducing oxygen at a cathode in an alkaline medium.

13 Claims, 5 Drawing Figures

METHOD AND MACHINE FOR WASHING AND BLEACHING TEXTILES

FIELD OF THE INVENTION

This invention relates to a method and machine for washing and bleaching textiles.

BACKGROUND OF THE INVENTION

In carrying out domestic and/or industrial washing and bleaching, use is generally made of commercial detergents in which a bleaching agent is incorporated, together with various fundamental constituents and additives normally contained in such detergents. The incorporation of a bleaching agent in commercial detergents at their production stage gives rise however to a certain number of problems, both with regard to the initial choice of the bleaching agent to be incorporated, and with regard to the further behavior of the detergent incorporating the bleaching agent (during storage and/or washing and/or after discharging the used water).

Those detergents containing a bleaching agent which are mostly available commercially at the present time are solid detergents (essentially in powder form), in which the bleaching agent most often consists of sodium perborate tetrahydrate. It is generally admitted that sodium perborate constitutes a very effective bleaching agent, provided the wash bath is raised to a temperature close to boiling point. The bleaching action of the perborate is relatively weak at lower wash temperatures (below 60° to 78° C.), and this constitutes a particularly important drawback in the present energy saving context. Attempts are made at the present time to add activators to these solid detergents for decomposing the perborate in order to allow washing and bleaching at lower temperatures. However these attempts have not at the moment proved entirely satisfactory, and formulations containing such activators are relatively costly. The use of perborate as a bleaching agent in detergents gives rise to a certain number of other drawbacks, most of which are related to its often excessive concentration (generally exceeding 15 to 20% by weight). A too high perborate concentration can in fact lead to deterioration of the textile fibers (in particular cellulose fibres), and to a weakening of the shades of certain colors (certain dyes being in this respect highly sensitive to an excess of oxidant). An excessive perborate concentration, in the case of detergents containing enzymes, can also exert a prejudicial influence on the biological action of these enzymes, although the perborate and enzymes normally exert complementary actions in certain processes of stain destruction (pigmentary and protein stains). It is also well established that boron compounds contained in residual wash water exert harmful effects on the environment. In this respect, boron is to a certain extent toxic, and this is more marked in the case of higher plants than in the case of microorganisms and animals (antifertilising effect). As boron compounds cannot be eliminated by the conventional treatment processes for water, the result is that the content of boron derivatives in certain rivers reaches an abnormally high level, tending to make them unsuitable for irrigation. These problems of water pollution by boron compounds are becoming so preoccupying that they have led certain countries to make laws aiming to limit the concentration of perborate in detergents, or indeed to prohibit them completely. Finally, sodium perborate has certain technical drawbacks such as segregation into powder (high apparent density of the perporate grain), friability of the grain (interference of perborate dust with production technology and its effect on working hygiene), and low solubility in cold water.

In an attempt to overcome the aforesaid drawbacks, it has been proposed to replace the perborate by other bleaching agents, such as sodium percarbonate. The effectiveness of these replacement agents has however proved to be much lower from the bleaching aspect. The choice of bleaching agent to be incorporated in solid detergents is also obviously limited to solid compounds, and this excludes any possibility of adding a liquid bleaching agent such as hydrogen peroxide, which is well known for its bleaching properties.

Excellent liquid detergents have appeared on the market at the present time, these being normally sold without any bleaching action. The incorporation in these liquids of a liquid bleaching agent such as hydrogen peroxide thus becomes theoretically possible, and many proposals have been made in this sense. However, such incorporation at the production stage gives rise to serious practical problems. In this respect, it is well known that hydrogen peroxide is a relatively unstable compound (the more unstable the more dilute it is used), so that its incorporation into a liquid detergent requires the use of complexing or stabilising substances to ensure correct stability during prolonged storage (and to thus prevent a too high active oxygen loss with time). However the presence of such complexing substances means that the liquid detergent is much too stable when it has to be used, so that it is not able to liberate at that moment sufficient active oxygen, with a sufficiently rapid speed in order to give truly effective bleaching. Furthermore, an increase in the stability of hydrogen peroxide preferably requires an acid environment, and this is in relative contradiction with the general formulations of detergents, in which it is desirable to have basic constituents in order to facilitate washing and bleaching. In the case of detergents containing enzymes, incorporating hydrogen peroxide into such liquid detergents during their production can have the further negative consequence of disturbing the biological activity of such enzymes, both during storage and at the start of washing and bleaching.

It has been known for some time to prepare hydrogen peroxide electrolytically by reducing oxygen at a cathode in an alkaline medium. To the knowledge of the applicant, it has never been proposed up to the present time to integrate such an electrolytic preparation process with textile washing and bleaching operations.

OBJECT OF THE INVENTION

The object of the invention is to obviate the aforesaid drawbacks by proposing a method for washing and bleaching textiles based on the use of a particularly active form of hydrogen peroxide as bleaching agent, which is incorporated at the required moment into the wash process and can be produced in situ immediately before its use.

SUMMARY OF THE INVENTION

To this end, the present invention provides a method for washing and bleaching textiles by means of an aqueous wash bath containing a detergent substantially free from bleaching. According to the invention for bleaching is carried out by incorporating into the wash bath, at the required moment, an aqueous alkaline oxidizing solution containing in particular hydrogen peroxide ions, said aqueous alkaline oxidising solution being produced electrolytically immediately before its incorporation into the wash bath, electrolytically by reducing oxygen at a cathode in an alkaline medium.

There is also disclosed herein a machine of the cell type for washing and bleaching textiles in accordance with my present method, comprising in particular an enclosure for containing said textiles to be treated, means for feeding water to the enclosure, means for feeding a detergent into the enclosure, means for forming an aqueous wash bath within the enclosure by mixing the detergent with water, and means for agitating the aqueous wash bath and the textiles to be treated relative to each other. The described machine also comprises an electrochemical reactor for producing an aqueous alkaline oxidizing solution containing in particular hydrogen peroxide ions, and means for introducing said aqueous alkaline oxidizing solution into the body of said aqueous wash bath at the required moment of the wash program, the machine being intended for use with a detergent substantially free from bleaching agent.

In the present description, the expression "textiles" is a general expression which embraces materials such as woven material, yarn or other fibrous or filament materials, these materials being natural organic, artificial or synthetic.

One of the essential characteristics of the method and machine to be described is thus the incorporation of a bleaching agent in the form of an aqueous alkaline oxidizing solution, containing in particular hydrogen peroxide ions, into a wash bath formed from a simplified detergent substantially free from any bleaching agent. This solution is produced in situ electrochemically immediately before its use, and is incorporated into the wash bath at the exactly required moment.

Simplified detergents which can be used in the present invention are any detergents, either known or as yet unknown, which are substantially free from any bleaching agent. Such detergents generally notably comprise basic constituents together with more or less optional additives. These basic constituents comprise essentially a surface active or detergent base (which can be a mixture of various surface active anionic and/or non-ionic and/or amphoteric agents etc.) and a builder (normally sodium tripolyphosphate). The more or less optional additives normally comprise substances such as corrosion inhibitors (for example sodium silicate), fillers (for example sodium sulphate), anti-deposition agents, mildew regulators, enzymes, optical blueing agents, perfumes etc.

The simplified detergents which can be used in the present invention can be in any physical form normally encountered in this type of application, such as powder, granulate, gel, paste, solution, emulsion, suspension etc. The essential characteristic is to be able to form an aqueous wash bath having the required detergent characteristics by mixing a correctly measured quantity of said simplified detergent with water, for the purpose of bringing the textiles to be treated in contact with the wash bath.

Once the textiles to be washed and bleached have been put into intimate contact with the wash bath prepared from the simplified detergent, the bleaching solution prepared electrochemically can then be incorporated into said wash bath at any required moment.

The aqueous alkaline solution containing hydrogen peroxide ions is produced electrochemically essentially by electrolysis of an initial alkaline solution in an electrochemical reactor comprising at least one cathode compartment fitted with a porous cathode, and at least one anode compartment fitted with an anode which is chemically inert towards the medium. When the initial alkaline solution has been fed into the cathode compartment of the electrochemical reactor, a compressed gas containing oxygen is circulated through the porous cathode, and an electric current is passed through the reactor to form hydrogen peroxide ions (and hydroxyl ions) on the active surface of the cathode by reduction of oxygen. The hydrogen peroxide ion and hydroxyl ion concentration in the catholyte progressively increases as electrolysis continues. The electrolysis is stopped when the hydrogen peroxide ion and hydroxyl ion concentration in the catholyte attains the required value. The catholyte can then be discharged to the outside of the cathode compartment for incorporation into the wash bath at the required moment in the wash process.

The required hydrogen peroxide ion and hydroxyl ion concentration in the bleaching solution is able to be obtained essentially because of the judicious use of an initial alkaline solution of weak concentration as the catholyte (the initial catholyte concentration is chosen at a value lower than the required hydroxyl ion concentration in the bleaching solution), and by the correct choice of the conditions under which the electrolysis is carried out, this electrolysis giving rise to a progressively increasing concentration of hydrogen peroxide ions and hydroxyl ions in the catholyte, which is discharged to the outside when it reaches the required concentration for the bleaching solution.

Advantageously, the parameters governing the electrochemical process (initial concentration of the alkaline solution, quantity of electricity passing through the reactor, reactor dimensions etc.) are adjusted so that the solution discharged from the electrochemical reactor has a total hydrogen peroxide concentration (i.e. hydrogen peroxide ions $HO_2^-$ + hydrogen peroxide $H_2O_2$) between 0.1 and 10 grams/liter of solution, and a pH of less than 14.

The choice of initial concentration of the alkaline solution fed into the cathode compartment is of prime importance. This initial concentration must not be too high if the bleaching solution finally obtained, and thus the wash bath into which the solution is to be incorporated, is not to have a too high alkalinity (in this respect, as electrolysis continues, the hydroxyl ion concentration in the catholyte progressively increases). At the same time, this initial concentration must not be too low if an acceptable yield with regard to the production of hydrogen peroxide ions is to be obtained. In this respect it has been shown that such a yield can be very low if the operation is carried out with an initial solution having a pH which is substantially neutral. It is highly desirable to therefore choose an initial solution which is weakly alkaline, in which the initial pH preferably lies between 10 and 13.

The constituent alkali of this initial solution can be any known alkali such as soda, potash etc. Soda is especially usable because of its low cost. As a modification, the constituent alkali of the initial solution could be one or more of the alkalis already present as constituents of the simplified detergent, instead of using an alkali external to the system as previously. In such a case, a simplified detergent can be used which has a formulation substantially modified in which the concentration of said alkalis can be substantially reduced or even zero (these alkalis then being directly provided by the bleaching solution). Such a modification has the great advantage of preventing the introduction of a surplus of alkali into the wash bath, and thus to enable the wash bath to be kept within the most acceptable alkalinity limits. By way of example, a mixture of sodium silicate and sodium sulphate could be used as the alkaline constituent of the initial solution to be fed into the cathode compartment of the electrochemical reactor (only the sodium silicate is a true alkali in this mixture, the sulphate serving to ensure good electrical conductivity of the medium), and a simplified detergent could then be used in which the sodium silicate and sodium sulphate concentration is greatly reduced or completely absent.

The bleaching solution can be prepared electrolytically by two main methods, one a batch method and the other continuous. The batch method consists of operating with a small catholyte volume and recycling this volume until the required concentration is obtained. Such a method enables a fairly small reactor to be used, and thus is relatively inexpensive. The continuous method consists of operating with a catholyte volume chosen according to the capacity of the cathode, so that the catholyte can be raised to the required concentration in a single passage across the cathode. Such a method requires the use of a much larger reactor, but it enables the recycling means to be dispensed with.

The bleaching solution produced electrolytically can be incorporated into the wash bath at any required point in the wash cycle. It can either be incorporated immediately (i.e. at the start of the wash cycle) or can be deferred (i.e. only during the wash cycle). This immediate or deferred incorporation can then be carried out either in a single operation (introducing all the solution at once) or in several operations (introducing successive fractions of the solution staggered with time). Depending on the duration of the electrolytic production process for the bleaching solution, and on the moment chosen for introducing said solution, the electrolytic production process can either be started simultaneously with the wash process or more generally before it (so that the bleaching solution can reach the required concentration at the moment chosen for its introduction).

The use of the aqueous alkaline oxidizing solution according to the invention as a substitute for the bleaching agents normally incorporated in conventional detergents has a certain number of important advantages, one of the main advantages being its high bleaching efficiency. The electrochemical method used for producing such a bleaching solution enables hydrogen peroxide to be obtained in a particularly active form, namely the hydrogen peroxide ion in an alkaline medium. Although the mechanism of the various reactions of hydrogen peroxide are not completely understood, it is generally assumed that the hydrogen peroxide ion $HOO^-$ is essentially responsible for bleaching. The aqueous alkaline solution used in the method according to the invention is consequently much more active for bleaching purposes than an equivalent solution prepared from commercial hydrogen peroxide. This latter, which is normally sold in the form of a stabilized alkaline solution, has a relatively low hydrogen peroxide ion content, because the reactions which contribute to the formation of these ions are counterbalanced by the reverse reactions which tend to cause them to disappear (this phenomenon is further accentuated by the addition of stabilizers to commercial hydrogen peroxide). In the present invention, the fact of being able to produce the bleaching solution immediately before its use allows the problems of stability during storage, which arises with commercial hydrogen peroxide, to be overcome. Furthermore, the fact of being able to incorporate this solution at the required moment in the wash process makes it possible to use the detergent more rationally, and in the case of a detergent containing enzymes, not to incorporate the bleaching solution into the wash bath until the enzyme cleaning process is sufficiently advanced so as to allow this latter its maximum efficiency. The electrochemical method used for producing the bleaching solution enables "soft" bleaching to be effected, so preserving the quality of the textiles to be treated while enabling the correct quantity of solution to be incorporated into the wash bath for bleaching the textiles (no deterioration of fibers or discoloration). The fact that bleaching is carried out with a peroxide-based solution in the present invention has the important advantage of allowing appreciable energy saving to be made, while bleaching effectively at relatively low temperatures, and minimizing the nuisance problems of residual wash water (no polluting by-product).

BRIEF DESCRIPTION OF THE DRAWING

The accompanying drawing illustrates diagrammatically and by way of example, one embodiment and one modification of a machine for effecting the washing and bleaching method according to the invention.

SPECIFIC DESCRIPTION

Figure 1:
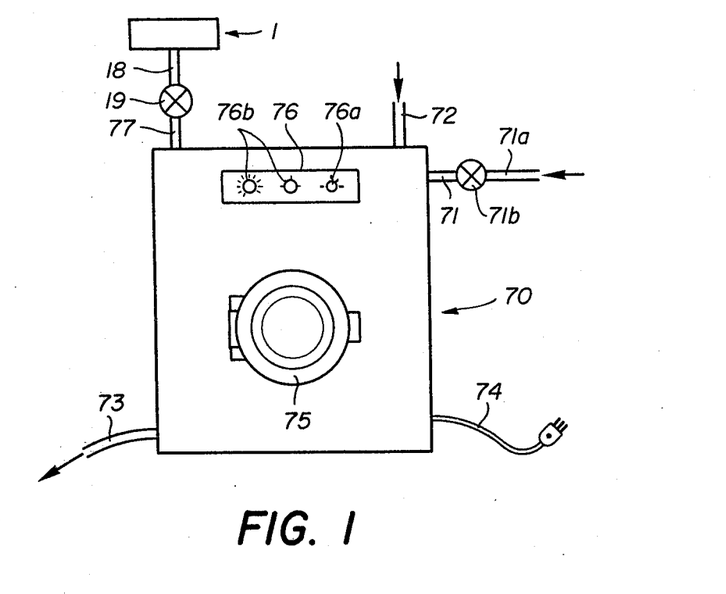
FIG. 1 is a diagrammatic view illustrating this embodiment.

FIG. 1 shows an automatic washing machine 70 of a type similar to those generally obtainable commercially. As this type of machine is well known, not all the constituent elements will be described, and only those elements will be described and shown which are new with respect to conventional machines, together with those known elements situated externally which enable the user to operate the machine (thus none of the known elements normally situated inside automatic washing machines will be described in detail, such as the enclosure for containing the textiles to be washed, the means for forming an aqueous wash bath inside this enclosure by mixing detergent with water, the means for agitating the aqueous wash bath relative to the textiles to be washed, the means for heating the water and/or the wash bath to the required temperature, the control circuits for effecting the various preselected wash programs etc.).

The automatic machine 70 shown in FIG. 1 comprises, in known manner, a water inlet 71 connected to a water feed pipe 71a via a solenoid valve 71b (operable by the machine control circuit); an inlet 72 for feeding the detergent; an outlet 73 for discharging the used water; a cable 74 for feeding electric current to the machine; an access door 75 for inserting the textiles to be washed in the machine; and a control panel 76 for controlling the various wash programmes, comprising a switch 76a and programming and selection buttons 76b. As a new feature, the machine 70 also comprises an additional inlet 77 connected via a solenoid valve 19 (also operated by the machine control circuit) to the outlet 18 of an electrochemical reactor 1 (the electrochemical reactor 1 is intended to be normally mounted within the machine frame. However, for clarity, it is shown on the drawing as situated externally of the machine). The automatic machine 70 is fed through its inlet 72 with a simplified detergent substantially free from bleaching agent, the electrochemical reactor 1 being able to produce an aqueous alkaline oxidizing solution containing in particular hydrogen peroxide ions which can be fed at the required moment into the machine by operating the solenoid valve 19.

Figure 2:
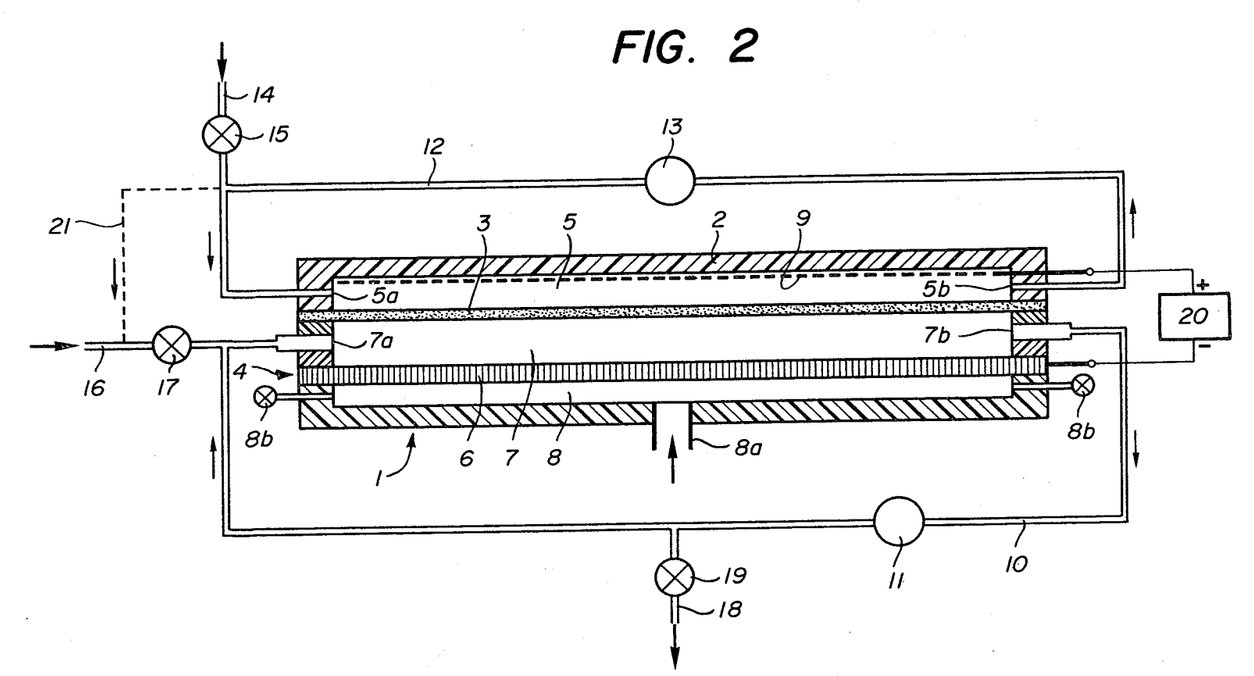
FIG. 2 is a diagrammatic cross-section illustrating an enlarged detail of FIG. 1.

FIG. 2 shows in detail one possible embodiment of the electrochemical reactor 1. The reactor 1 shown in this figure comprises a single elementary cell consisting of a substantially horizontal casing 2 of an electrically insulating material. The casing 2 is divided by a horizontal flat diaphragm 3 into two superposed compartments 4 and 5, namely a lower cathode compartment 4 and an upper anode compartment 5. The cathode compartment 4 is itself divided by a horizontal flat porous cathode 6 into two superposed chambers 7 and 8, namely an upper chamber 7 and a lower chamber 8. The upper chamber 7 is designed to contain the catholyte, and is provided at its opposite ends with an inlet nozzle 7a and an outlet nozzle 7b for the catholyte. The lower chamber 8 is provided for feeding compressed air (of the order of 100 to 1000 grams/cm$^2$) to the porous cathode 6 by way of an inlet nozzle 8a connected to a source of compressed air (not shown), the excess compressed air being able to escape through the safety valves 8b. The porous electrode 6 (gaseous diffusion electrode) is advantageously constructed of a hydrophobic conducting material able to hold back the water while allowing the air to pass. The porous cathode 6 can thus for example be a carbon felt impregnated with a teflon suspension, or porous blocks of vitreous carbon of open porosity, the thickness of this cathode being advantageously between 5 and 10 mm.

The anode compartment 5 is designed to contain the anolyte, and is fitted with an anode 9 (or counter electrode) disposed against its upper wall, and an inlet nozzle 5a and outlet nozzle 5b for the anolyte, these being disposed at its opposing ends. The anode 9 is advantageously constructed of a conducting material which is chemically and electrochemically inert towards the anolyte. The anode 9 can for example be a material such as platinum plated titanium, graphite, suitably chosen stainless steel or any other material which constitutes a dimensionally stable anode. The flat diaphragm 3 which separates the anolyte from the catholyte is advantageously in the form of a cation exchange membrane or a semi-permeable microporous diaphragm.

In the reactor of FIG. 2, the outlet nozzle 7b and inlet nozzle 7a of the chamber 7 are connected together by means for recycling the catholyte, in the form of a conduit 10 and a pumping member 11. Likewise, the outlet nozzle 5b and inlet nozzle 5a of the anode commpartment 5 are connected together by means for recycling the anolyte, in the form of a conduit 12 and a pumping member 13. The reactor also comprises a first feed conduit 14 connected by way of a valve 15 to a part of the conduit 12 close to the inlet nozzle 5a of the anode compartment 5 a second feed conduit 16 connected by way of a valve 17 to a part of the conduit 10 close to the inlet nozzle 7a of the chamber 7, and a discharge conduit 18 connected by way of a valve 19 to the conduit 10 upstream of the pumping member 11.

The first feed conduit 14 is used to feed into the anode compartment 5 an alkaline solution having an initial concentration exceeding the required bleaching solution concentration, this initial solution forming the anolyte for the reactor. The second feed conduit 6 is used to feed into the chamber 7 an alkaline solution having an initial concentration less than the required bleaching solution concentration, this solution constituting the catholyte for the reactor. The discharge conduit 18 enables the catholyte to be discharged to the outside after it has been recycled a certain number of times to reach the required concentration, the discharged catholyte then constituting the bleaching solution.

The porous cathode 6 and anode 9 of the reactor are connected to the negative and positive poles respectively of a direct current source 20.

The operation of the washing machine herein described is as follows: the feed valves 15 and 17 are opened and the discharge valve 19 is closed, and an alkaline solution of an initial concentration exceeding the concentration of the treatment solution to be prepared is fed through the feed conduit 14 into the anode compartment 5, and an alkaline solution of an initial concentration less than the concentration of the bleaching solution to be prepared is fed through the feed conduit 16 into the chamber 7 fitted with the cathode 6 (the fed quantities of solution are a function of the respective volumes of the chambers 5 and 7). The feed valves 15 and 17 are then closed (as a modification, the aforesaid operations could be completely automated, the user then having to do no more than feed the correct quantities of alkali into a container provided for this purpose on the reactor 1). The textiles to be washed and bleached having been inserted into the machine 70 at the same time, the required wash programme is then selected on the control panel 76, and the unit is started by operating the switch 76a. By switching the machine on, current is fed to the reactor 1, and the means for feeding air to the cathode 6 and the means for recycling the catholyte and anolyte are started (the wash process can be started simultaneously with, or later than the starting of the reactor).

The half reactions which then occur at the reactor electrodes are as follows:

At the anode: $2OH^- \rightarrow \frac{1}{2}O_2 + H_2O + 2e^-$

At the cathode: $O_2 + H_2O + 2e^- \rightarrow HO_2^- + OH^-$

It can thus be seen that when the catholyte passes through the chamber 7, oxygen is reduced at the cathode to form hydrogen peroxide ions $HO_2^-$ and hydroxyl ions $OH^-$, and as the catholyte continues to recycle, the concentration of the hydrogen peroxide ions and hydroxyl ions in the catholyte progressively increases. Likewise, as the anolyte passes through the anode compartment 5, the alkali concentration in the anolyte progressively falls. The catholyte and anolyte are recycled until the hydrogen peroxide ion and hydroxyl ion concentrations in the catholyte reach the required values, the catholyte then constituting the required bleaching solution. The reactor 1 is then stopped, and the bleaching solution is fed into the washing machine through the solenoid valve 19 at the required moment in the wash programme. The anolyte, in which the alkali concentration has been greatly reduced, is also discharged from the reactor and flows away with the used water. Instead of being discharged away with the used water, this anolyte can be recovered to serve as the catholyte for preparing a new supply of bleaching solution (its transfer being indicated diagrammatically on the drawing by the dashed line 21).

In the described embodiment, the reactor does not necessarily have to be horizontal. It can be particularly advantageous to dispose the reactor in a slightly inclined position (of the order of 10°), to prevent any oxygen forming at the anode from accumulating in the anode compartment, and to thus facilitate its discharge to the outside.

In the electrochemical process described heretofore, it has been stated that the cathode solution containing hydrogen peroxide constitutes the useful product for direct use as the bleaching solution, and the anode solution depleted in alkali constitutes only a by-product of little interest (except for the said recovery). However, it is possible to upvalue this by-product constituting the anode solution by making small modifications to the previously described electrochemical process, to enable an anode solution containing hypochlorite to be produced. To do this, it is simply necessary to feed into the anode compartment 5 an initial aqueous solution containing both soda and sodium chloride. By feeding this initial solution containing sodium chloride into the anode compartment, it is possible to feed an initial solution also containing sodium chloride into the cathode compartment, to improve the conductivity of the solutions and reduce the ohmic drop through the cation exchange separator (this sodium chloride does not participate in the cathode reaction, but serves only as a supporting salt).

The purpose of the sodium chloride in solution in the anode compartment is to cause formation of gaseous chlorine in contact with the anode, in accordance with the reaction:

The gaseous chlorine thus formed reacts with the soda to give the hypochlorite, by the reaction:

As the anolyte is continuously recycled, its hypochlorite concentration progressively rises and its soda concentration progressively falls.

The anode solution obtained at the end of recycling, containing hypochlorite, can then be used in combination with the cathode solution containing hydrogen peroxide, for the washing/bleaching operation. This treatment is advantageously effected by firstly bringing the anode solution containing hypochlorite into contact with the material to be treated, then bringing the cathode solution containing hydrogen peroxide into contact with this material. The combined use of hypochlorite and hydrogen peroxide has the great advantage of giving rise to the formation of "singlet" oxygen, which has proved to be an excellent oxidising agent.

In the embodiment heretofore described, the single cell 1 of the reactor could be replaced by a plurality of cells (battery) mounted in series one after the other, in order to reduce the time of the electrolytic preparation process.

Figure 3:
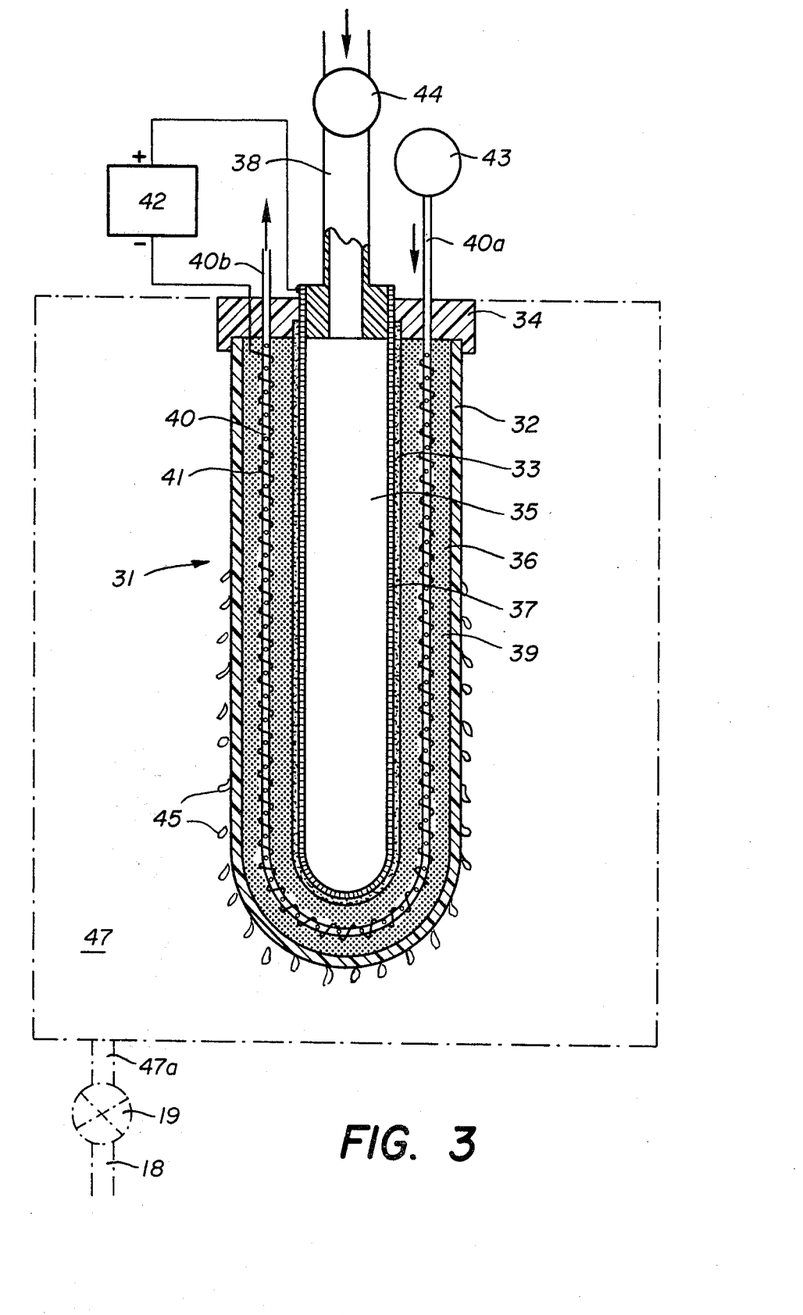
FIG. 3 is a diagrammatic cross-section illustrating a modification of the detail of FIG. 2.

FIG. 3 shows a further possible modification of the electrochemical reactor which can be incorporated with the machine according to the invention, in which a reactor of "open cell" type is used for preparing bleaching solution by a continuous method. The electrochemical reactor shown in FIG. 3 comprises a single tubular elementary cell 31. The cell 31 is composed of two concentric porous tubular sheaths 32 and 33 with round bottoms, namely an outer sheath 32 constructed of an electrically insulating hydrophilic microporous material such as cloth or felt (for example of nylon, glass fibers or polyethylene). The open end of the sheaths 32 and 33 is closed by a flat cover 34 of an insulating material. The inner sheath 33 acts as a microporous diaphragm which divides the cell 31 into two coaxial compartments 35 and 36, namely a central cylindrical anode compartment 35 and a peripheral annular cathode compartment 36. The central anode compartment 35 is fitted with a porous tubular anode 37 disposed against the inner wall of the microporous diaphragm 33, the porous anode 37 being constructed of a material such as porous graphite or porous vitreous carbon. The anode compartment 35 is designed to contain the anolyte, and is provided upperly with an inlet nozzle 38 through the cover 34. The peripheral cathode compartment 36 is filled with a tightly packed bed of electrically conducting particles 39 (such as granules of graphite and active carbon, or carbon fibres), to serve as a three dimensional cathode. This bed is made partly hydrophobic by treating with a teflon suspension. The bed of particles 39 is traversed over its entire length by a conduit 40 pierced with a plurality of apertures, its ends being connected respectively to an inlet nozzle 40a and an outlet nozzle 40b provided in two diametrically opposing positions in the cover 34. About the conduit 40 there is wound a wire current collector 41 (for example of gold), for connection to the negative pole of a direct current source 42, the positive pole being connected to the anode 37.

The perforated conduit 40 is connected by way of the inlet nozzle 40a to a source of compressed air 43 which can feed cold compressed air at a pressure of the order of 20 to 50 g/cm$^2$, the purpose of the conduit 40 therefore being to feed compressed air to the dispersed cathode 39 (the air being cold in order to maintain a temperature inside the cell 1 of the order of 15° to 20° C., so as to optimise the electrolysis efficiency). The inlet nozzle 38 of the anode compartment 35 is connected via a pumping member 45 to a reservoir (not shown) containing an alkaline solution having a concentration substantially identical to (or slightly greater than) the alkali concentration of the bleaching solution to be prepared. The purpose of the pumping member 44 is to continuously feed the anode compartment 35 with an alkaline solution under pressure, the pressure at which the alkaline solution is fed being chosen such that the pressure in the anode compartment 35 is always greater than the pressure in the cathode compartment 36.

The described electrochemical reactor operates in the following manner: the hydrogen peroxide and alkali concentrations in the bleaching solution to be prepared are chosen, current is fed to the cell 31, and the means for feeding the alkaline solution to the anode compartment 35 and the means for feeding air to the dispersed cathode 39 are started, and the anode compartment 35 is constantly maintained at a higher pressure than the cathode compartment 36. The alkaline solution which flows into the anode compartment 35 (forming the anolyte) undergoes the anode reaction on contact with the anode 37 (this reaction is identical to that previously described), so that it becomes charged with oxygen while losing part of its alkali concentration. This solution, depleted in alkali, then passes through the microporous diaphragm 33 because of the pressure difference. When it reaches the cathode compartment 36, the solution depleted in alkali (which constitutes the catholyte) then undergoes the cathode reaction (this reaction being identical to that previously described), so that it becomes charged in hydrogen peroxide ions and hydroxyl ions before being discharged to the outside in the form of droplets 45 on the outer wall of the porous ceramic 32. The parameters which govern the operation of the cell 31 (voltage and current density fed to the cell, pressure in the cathode and anode compartments etc.) are chosen such that the catholyte becomes enriched in hydrogen peroxide and hydroxyl ions to the required concentration for the bleaching solution just as the catholyte reaches the exterior in the form of droplets 45, so that the droplets 45 collected by the container 47 constitute the bleaching solution for feeding at the required moment to the machine 70 by way of the solenoid valve 19.

As a modification, it could equally be envisaged to completely dispense with the intermediate container 47 and solenoid valve 19 (FIG. 3), and to dispose the cell 31 directly within the enclosure for containing the wash bath, so as to allow continuous feed of bleaching solution into the wash bath, drop by drop.

Comparative detergency tests

Detergency tests are described hereinafter comparing the washing and bleaching method according to the invention (combined use of a simplified detergent without bleaching agent and a bleaching solution produced electrochemically) with more classical washing methods carried out using detergents which include a conventional bleaching agent.

In carrying out these various tests, the following basic alternative detergents were used:

a conventional detergent including a bleaching agent, consisting of a well known commercial washing powder (containing approximately 25% by weight of sodium perborate). This detergent, which is used as a reference for the various measurements of detergency effectiveness, is designated by the symbol RF hereinafter;

a simplified detergent without bleaching agent, the formulation of which has been devised by the applicant, and which will be designated by the symbol BT hereinafter. The BT detergent comprises the following constituents (quantities expressed in grams):

| | | |
|---|---|---|
| Sodium alkylarylsulphonate (35%) | 43.0 g | |
| Fatty $C_{18}$ alcohol condensed with 25 ethylene oxide | 4.5 g | Surface active base |
| Nonylphenol condensed with 25 ethylene oxide | 4.5 g | |
| Soap | 4.5 g | |
| Sodium tripolyphosphate | 52.5 g | |
| 49° Be sodium silicate (45% by weight) | 23.5 g | |
| Sodium sulphate | 15.0 g | |
| Carboxymethyl cellulose | 1.5 g | |
| Tetraacetic ethylene diamine | 1.0 g | |
| Proteolytic enzymes (Esperase M 40) | 0.75 g | |
| Optical blueing agents | | |

| | |
|---|---|
| -continued | |
| (optazur) | 0.75 g | and a detergent BT' totally identical to the aforesaid detergent BT, except that it contains no sodium silicate or sulphate.

The detergent BT is used in the tests in combination with one or other of the two following bleaching agents:

sodium perborate, introduced directly into the detergent BT (BT+perborate)

commercial hydrogen peroxide solution, introduced into the wash bath at the beginning of washing (BT+commercial $H_2O_2$).

The detergent BT' is used in the tests in combination with the bleaching solution produced electrochemically according to the invention (BT'+$H_2O_2$ produced electrochemically), this solution being introduced at the required moment into the wash bath. This solution is prepared by a reactor similar to that of FIG. 2, starting from an initial alkaline solution containing a mixture of sodium silicate and sulphate.

The reactor used has the following characteristics:

graphite felt cathode made hydrophobic in depth by suitable treatment;

platinum plated titanium anode;

separator of the cation exchange membrane type sold commercially under the name of NAFION 425 (by Messrs. Dupont de Nemours). The surface area of the separator is 2.50 dm$^2$.

By way of example, to prepare a bleaching solution with this reactor containing 2.25 g/l of hydrogen peroxide starting from a mixture containing 7.5 g/l of sodium sulphate and 11.75 g/l of 49° Bé sodium silicate, the method is as follows: an initial alkaline solution containing 7.5 g/l of sodium sulphate and 11.75 g/l of 49° Bé sodium silicate is fed into the cathode compartment, and an aqueous soda solution having an initial soda concentration of 40 g/l is fed into the anode compartment, the respective solution volumes fed into each of the compartments being 2000 ml (the temperature of these solutions being maintained at 22° C.). An electric current is then applied to the reactor, and the means for feeding air to the cathode and the means for recycling the catholyte and anolyte are started. The voltage at the cathode is adjusted to −800 mV relative to a calomel electrode (corresponding to a potential difference across the cell terminals of 2.4 Volts and an average current density of 10 mA/cm$^2$). The catholyte and anolyte are recycled for 240 minutes, after which the catholyte has the required hydrogen peroxide concentration (this time can obviously be considerably reduced by using a plurality of cells connected in series instead of a single cell, and/or by increasing the cell dimensions). The catholyte is then discharged to the outside (2000 ml are collected) for use as the bleaching solution.

The various tests are carried out by means of an automatic STATOMATIC 433 washing machine marketed by Messrs. Thomson-Brandt (the said electrochemical reactor being disposed in proximity thereto). These tests are carried out under the following conditions:

approximate quantity of water fed automatically into the machine: 15 liters (water hardness=14.5° F.)

basic detergent added: 150 g for the RF and BT detergents and 113 g for the BT' detergent bleaching agents (perborate, commercial $H_2O_2$, $H_2O_2$ produced electrochemically) used in combination with the BT and BT' detergents: see the various tests hereinafter, textiles to be washed and bleached: 2 kg load of personal linen containing uniformly distributed textile test bands No. 103 (artificially soiled bands) prepared by EMPA (Switzerland). These bands comprise essentially two types of stain, namely stains of albumin type (cotton soiled with blood, milk, Indian ink), and stains known as bleachable stains (cotton died with sulphur black and/or raw cotton and/or cotton soiled with red wine).

Figure 4:
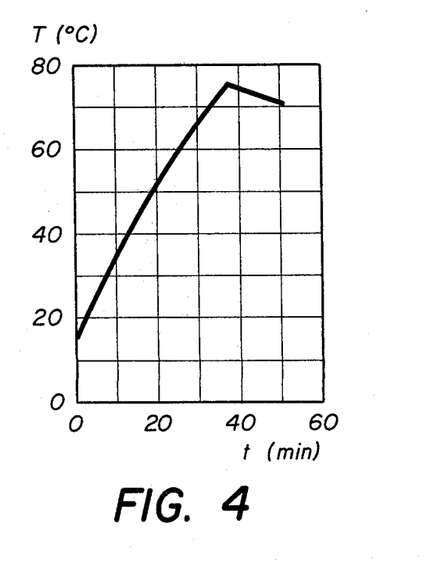
FIG. 4 is a diagram which explains a first mode of operation for a machine used for the comparative tests.

These tests are carried out without prewash, by two different programmes:

Program I: the curve showing the temperature of the wash bath against time during the wash cycle of this programme is shown in FIG. 4 (washing time 50 minutes; maximum temperature attained 76° C.).

Figure 5:
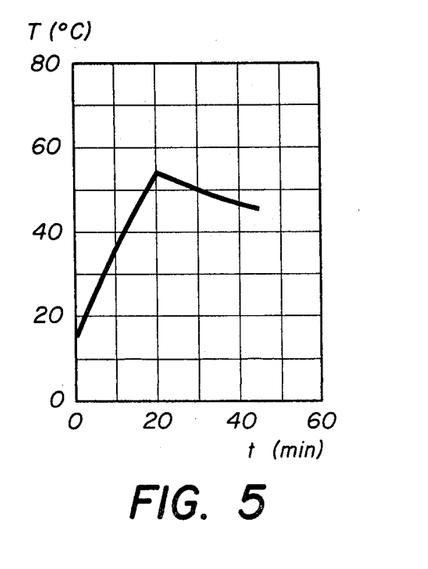
FIG. 5 is a diagram similar to FIG. 3, explaining a second mode of operation for this machine.

Program II: the wash cycle parameters for this program are shown on the curve of FIG. 5 (washing time 47 minutes; maximum temperature attained 54° C.).

The detergency efficiency corresponding to each of these tests is determined by light reflectance measurements using a MACBETH reflectometer, carried out on the EMPA textile bands, before and after washing the bands respectively.

For clarity reasons, the detergency efficiency for a determined text X will be expressed relatively, by relating it to that for a reference test A carried out under similar operating conditions using the wash powder RF. This relative efficiency, expressed in %, is given by the relationship:

$$\frac{E_X - E_A}{E_A}$$

where $E_X$ and $E_A$ indicate the amount of clarification produced by the test X and by the reference test A, the clarification E being given by the relationship:

$E = R$ after washing $- R$ before washing where R indicates the measured reflectance.

I. Tests under program I

The following tests are carried out:

(1) Test A: (RF)

150 g of detergent RF (2) Test B: (BT+perborate)

150 g of detergent BT
40.5 g of perborate (i.e. 27% of perborate calculated on the active material)

(3) Test C: (BT+commercial $H_2O_2$)

150 g of detergent BT
26 g of 32% $H_2O_2$ (marketed by Messrs. Air Liquide), equivalent to 25% of perborate.

(4) Test D: (BT'+$H_2O_2$ produced electrochemically)

(4-1) Test D1

113 g of detergent BT'
2 liters of bleaching solution containing 2.25 g/l of hydrogen peroxide (total hydrogen peroxide=hydrogen peroxide ions +hydrogen peroxide), 2.25 g/l of sodium sulphate and 11.75 g/l of 49° Be sodium silicate (solution prepared in the aforesaid manner). This hydrogen peroxide concentration corresponds to 4.5 g of 100% $H_2O_2$, equivalent to 15.6% of perborate. The solution is fed into the wash bath at the beginning of the wash cycle.

4-2 Test D2

113 g of detergent BT'
2 liters of bleaching solution containing 1.6 g/l of hydrogen peroxide, 1.5 g/l of sodium sulphate and 11.75 g/l of 49° Be sodium silicate. This hydrogen peroxide concentration corresponds to 3.2 g of 100% $H_2O_2$, equivalent to 11.6% of perborate. The solution is fed into the wash bath 30 minutes after the beginning of the wash cycle.

The detergency results obtained for these different tests are given in the following table:

| Detergency efficiency relative to the reference test A (in %) | | |
|---|---|---|
| | On the albumin stains | On the so-called bleachable stains |
| A | 0 | 0 |
| B | −4% | +12.5% |
| C | +9% | +7.5% |
| D1 | +43% | +54% |
| D2 | +62.5% | +38.5% |

From this table, it can be seen that the detergency results for tests B (BT+perborate) and C (BT+commercial $H_2O_2$) are substantially comparable to those obtained for the known commercial reference detergent RF (test A), whereas the results obtained by the method according to the invention (tests D1 and D2) are much better.

The measurements carried out on the albumin stains enable the effectiveness of the proteolytic enzymes to be judged (it is in this respect well known that oxidising agents generally disturb the enzymatic action). The fact that test D2 shows the better efficiency indicates that it is advantageous to delay the addition of the hydrogen peroxide, to allow a more effective action of the enzymes during the initial 30 minutes of the wash cycle.

The measurements carried out on the bleachable stains enable the effectiveness of the bleaching agent to be judged. These measurements demonstrate the clearly superior effectiveness of the bleaching solution according to the invention over more conventional bleaching agents. It must further be emphasised that such a result is obtained, in the method according to the invention, by a considerably smaller quantity of bleaching agent (approximately one half) than the quantity in the reference detergent.

II. Tests under program II

The following tests are carried out:

(1) Test A, B and C: identical to those under programme I (2) Test D: (BT'+$H_2O_2$ produced electrochemically)

113 g of detergent BT'
1 liters of bleaching solution containing 3.1 g/l of hydrogen peroxide, 15 g/l of sodium sulphate and 11.75 g/l of 49° Be sodium silicate. The hydrogen peroxide concentration corresponds to 3.1 g of 100% $H_2O_2$, equivalent to 11.3% of perborate. The solution is fed into the wash bath at the beginning of the wash cycle.

The detergency results obtained for these tests are shown in the following table:

| Detergency efficiency relative to the test of reference A (in %) | | |
| --- | --- | --- |
| | On the albumin stains | On the so-called bleachable stains |
| A | 0 | 0 |
| B | +16% | +5.5% |
| C | −11% | −17.5% |
| D | +10.5% | +53% |

This table shows the superior bleaching efficiency of the method according to the invention over traditional wash processes using more conventional bleaching agents.

We claim:

1. A method for washing and bleaching textiles by means of an aqueous wash bath containing a detergent substantially free from bleaching agent, wherein said bleaching is carried out by the step of incorporating into said wash bath, at the required moment, an aqueous alkaline oxidizing agent containing in particular hydrogen peroxide ions, said aqueous alkaline oxidising solution being produced electrolytically, immediately before its incorporation into said wash bath, by reducing oxygen at a cathode in an alkaline medium.

2. A method as claimed in claim 1, wherein said aqueous alkaline oxidizing solution is produced electrolytically by:
   using an electrochemical reactor comprising at least one cathode compartment fitted with a porous cathode, and at least one anode compartment fitted with an anode which is electrochemically inert towards the medium,
   feeding into said cathode compartment an initial weakly concentrated alkaline solution to constitute the catholyte,
   circulating a compressed fluid containing oxygen through said porous cathode,
   feeding a current to said reactor so as to form hydrogen peroxide ions and hydroxyl ions on the active surface of said cathode by reduction of oxygen, said reduction giving rise to a progressively increasing concentration of hydrogen peroxide ions and hydroxyl ions in said catholyte,
   and passing through said reactor a quantity of electricity sufficient for said hydrogen peroxide ion and hydroxyl ion concentration in said catholyte to reach the required value, the catholyte having thus attained the required concentration then constituting said bleaching solution.

3. A method as claimed in claim 2, wherein said initial weakly concentrated alkaline solution has a pH preferably between 10 and 13.

4. A method as claimed in claim 2, wherein the constituent alkali of said initial alkaline solution is soda.

5. A method as claimed in claim 2, wherein the constituent alkali of said initial alkaline solution is formed from a mixture of sodium silicate and sodium sulphate, the chosen detergent substantially free from bleaching agent which is contained in said wash bath then being a detergent which is also substantially free from sodium silicate and sodium sulphate.

6. A method as claimed in claim 1, wherein said bleaching solution is incorporated into said wash bath at the beginning of the wash cycle.

7. A method as claimed in claim 1, wherein said bleaching solution is incorporated into said wash bath during the wash cycle.

8. A method as claimed in claim 1, wherein said bleaching solution is incorporated into said wash bath all at once.

9. A method as claimed in claim 1, wherein said bleaching solution is incorporated into said wash bath in successive fractions staggered in time.

10. A method as claimed in claim 1, wherein said detergent contained in said wash bath comprises enzymes, said bleaching solution being incorporated into said wash bath when the enzymatic cleaning operation is sufficiently advanced.

11. A method as claimed in claim 2, wherein an initial solution containing soda and sodium chloride is fed into said anode compartment of the reactor to enable hypochlorite to be produced.

12. A method as claimed in claim 10, wherein said anolyte containing hypochlorite together with said catholyte containing the hydrogen peroxide ions are incorporated into said wash bath.

13. A method as claimed in claim 2, which comprises using a reactor comprising a plurality of elementary cells connected in series.

* * * * *